United States Patent [19]

Ishigaki et al.

[11] Patent Number: 5,084,225
[45] Date of Patent: Jan. 28, 1992

[54] METHOD FOR MAKING A CATHODE RAY TUBE

[75] Inventors: Toshimasa Ishigaki; Yasuhiko Uehara, both of Chiba; Fusaji Shoji, Yokohama; Ryoichi Sudo, Yokusuka; Etsuji Iwami, Hitachi; Hirohumi Izumi, Kitaibaraki, all of Japan

[73] Assignees: Hitachi, Ltd.; Hitachi Chemical Co., Ltd., both of Tokyo, Japan

[21] Appl. No.: 376.020

[22] Filed: Jul. 6, 1989

Related U.S. Application Data

[62] Division of Ser. No. 128,143, Dec. 3, 1987, Pat. No. 4,866,338.

Foreign Application Priority Data

Dec. 5, 1986 [JP] Japan .................. 61-290696

[51] Int. Cl.$^5$ .................. B29C 39/12; B32B 31/06
[52] U.S. Cl. .................. 264/261; 264/294
[58] Field of Search .................. 264/261, 294; 313/477 R, 478; 358/247; 525/27

[56] References Cited

U.S. PATENT DOCUMENTS

| | | | |
|---|---|---|---|
| 4,185,220 | 1/1980 | Oberg | 313/478 |
| 4,599,274 | 7/1986 | Ando et al. | 428/442 |
| 4,641,059 | 2/1987 | Sumiyoshi et al. | 313/477 R |

FOREIGN PATENT DOCUMENTS 61-44923  3/1986  Japan .
61-142627 6/1986 Japan .

Primary Examiner—Leo B. Tentoni
Attorney, Agent, or Firm—Antonelli, Terry, Stout & Kraus

[57] ABSTRACT

A method for making a cathode ray tube involves the step of positioning a non-reflective transparent plate in front of a face plate of a tube body with a given space therebetween; a step of filling the space with a resin composition and a step of heating the resin composition filled in the space to harden the composition to bond the tube body and the non-reflective transparent plate to each other. The resin composition is an unsaturated polyester resin composition which comprises an unsaturated polyester having a molecular weight per one unsaturated group of 1000 to 8000 and (1) a polymerizable monomer, a low-temperature hardener and a high-temperature hardener or (2) styrene and/or a derivative thereof and an unsaturated compound having a refractive index of 1.5 or less. This composition can be molded in a short time and forms no strain on hardening and serves as an adhesive for production of the cathode ray tube.

5 Claims, 3 Drawing Sheets

METHOD FOR MAKING A CATHODE RAY TUBE

FIELD OF THE INVENTION AND RELATED ART STATEMENT

1. Field of the Invention

This invention relates to an unsaturated polyester resin composition for treatment of a cathode ray tube and use of this composition, namely, a method for producing a cathode ray tube in which this composition is used as an adhesive and to the resulting cathode ray tube.

2. Related Art

Hitherto, it has been known to use as an adhesive to be interposed between a face plate and a non-reflective transparent plate, an unsaturated polyester resin composition prepared by dissolving an unsaturated polyester having a molecular weight of 500–8000 per one unsaturated group with a monoester and/or diester of an unsaturated dibasic acid with styrene as disclosed in Japanese Patent Laid-Open Application (Kokai) No. 44923/86.

Further, in order to bond a cathode ray tube to a front glass with said composition, there has been known a method which comprises, as shown in accompanying FIG. 1, holding front glass 4 (non-reflective transparent plate) of nearly the same size and same curvature with those of face plate part 2 to cover the face plate part by tape 6 with a very small space G therebetween, filling resin composition such as unsaturated polyester resin composition, epoxy resin composition or the like in the space therebetween and hardening the composition. (cf. Japanese Patent Laid-Open Application (Kokai) No. 142627/86).

The conventional resin compositions used to join a cathode ray tube and a front glass have their respective advantages and disadvantages and those which satisfy requirements for both the desired properties and operability have not yet been obtained.

For example, epoxy resin compositions have high adhesiveness and are suitable for bonding front glass to face plate part, but these have compositions a considerable coloring property and are not preferred for cathode ray tubes for which color is important.

Epoxy resin compositions are higher in viscosity than unsaturated polyester resin compositions and consequently have a defect that bubbles included at the time of mixing with a hardener or injection of the resin are difficult to remove. Besides the viscosity of the epoxy resins rapidly increases after mixing with a hardener and hence the injection working life is very short and smooth operation requires a special mixing device or injection device and thus operability is also low.

Unsaturated polyester resin compositions are relatively low in viscosity, i.e., usually several poises and can be easily mixed with a hardener or injected between the face plate part of cathode ray tube and the front glass. Further, because of the low viscosity, removal of bubbles at the time of mixing and injection is easy. However, when the proportion of the hardener to be used in an amount of several percent of the unsaturated polyester resin composition varies from the given conditions, local strain occurs on hardening which results in, due to a lens effect, stripe patterns or bright spots on the screen when the cathode ray tubes are actuated.

These stripe patterns and bright spots are defects in images and damage the value in the case of articles for providing of fine images designated as fine or ultrafine cathode ray tubes.

The hardening strain is also generated by abrupt heating or ununiform temperature in the hardening oven and sufficient control of the heat must be provided.

Unsaturated polyester resin compositions suffer from many problems in production as mentioned above, but these compositions have advantages such as less coloration, superior transparency, low viscosity and easy removal of bubbles.

SUMMARY OF THE INVENTION

The object of this invention is to provide an adhesive composition which can be shaped in a short time and is free from strain on hardening and a cathode ray tube in which this composition is employed.

That is, this invention provides an unsaturated polyester resin composition for production of a cathode ray tube which composition is low in viscosity and high in transparency and adhesiveness, can be shaped in a short time and shows no strain on hardening and which is free from the defects such as difficulty in shaping in a short time, formation of bright spots or striping patterns caused by strain on abrupt hardening to result in defects in images which are seen in the conventional ultra-soft unsaturated polyester resin composition for production of cathode ray tubes, while keeping the advantages of unsaturated polyester resin compositions as mentioned above. This invention further provides a cathode ray tube with using said composition.

More particularly, one aspect of this invention is an unsaturated polyester resin comprises an unsaturated polyester having a molecular weight of 1000–8000 for one unsaturated group and (1) a polymerizable monomer, a low-temperature hardener and a high-temperature hardener or (2) styrene and/or derivatives thereof and an unsaturated compound having a refractive index of 1.5 or less.

Especially, in the case of (2), preferably, the blending ratio of each component satisfies the following formula:

$$(b)/\{(a)+(c)\} = 1/5 - 5/1$$

wherein (a) denotes the number of unsaturated group in the unsaturated polyester, (b) denotes the number of unsaturated group in the styrene and/or derivatives thereof and (c) denotes the number of unsaturated group in the unsaturated compound having a refractive index of 1.5 or less.

Another aspect of this invention is a cathode ray tube in which said unsaturated polyester resin composition is used as an adhesive.

DETAILED DESCRIPTION OF PREFERRED EMBODIMENTS

Figure 1:
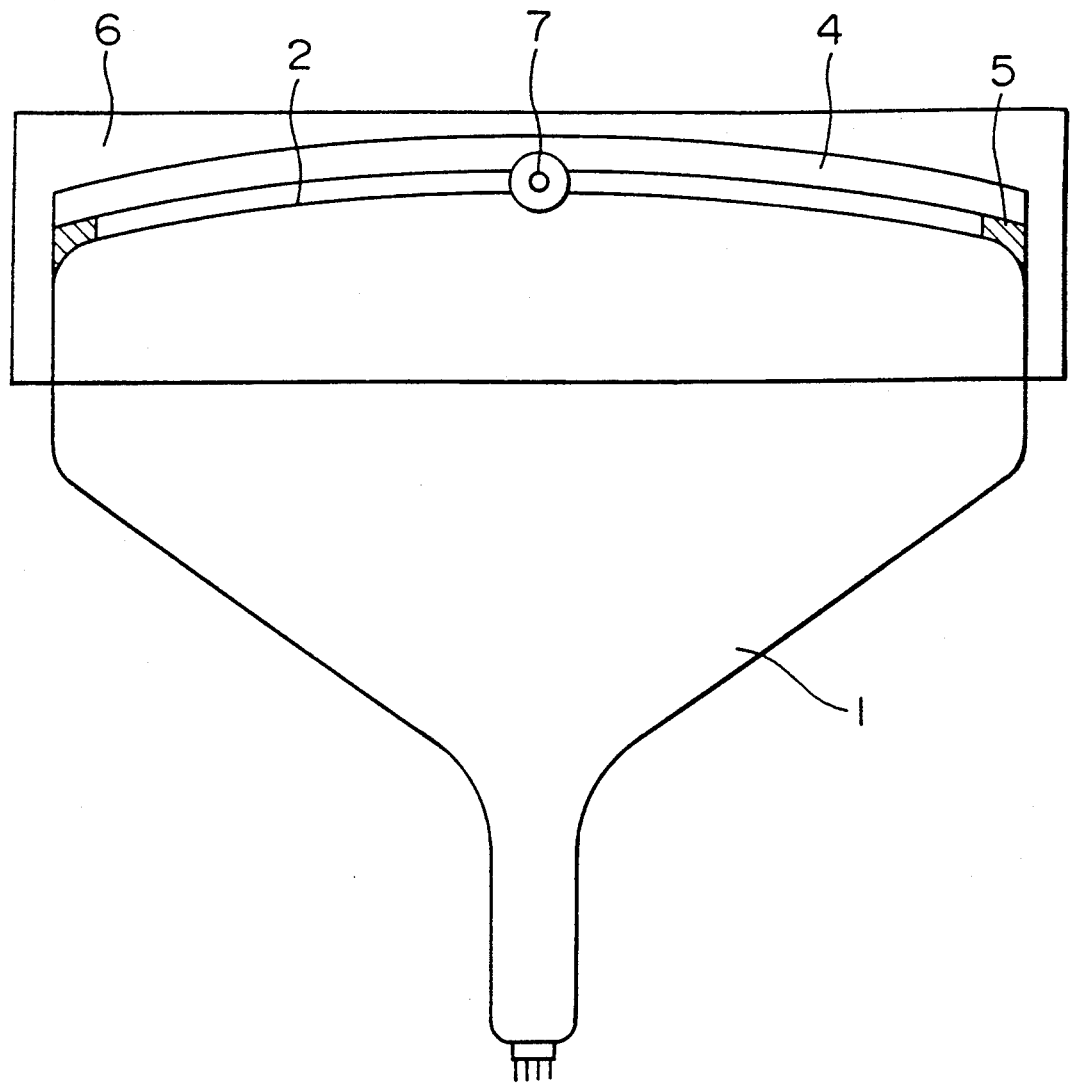
FIGS. 1 and 2 are cross-sectional front views showing essential parts of a cathode ray tube which is one example of this invention and FIG. 3 is a cross-sectional view of essential parts of a cathode ray to be for explaining one example of the method for production of the cathode ray tube of this invention wherein 1 indicates a body of cathode ray tube, 2 indicates a face plate, 3 indicates a resin composition, 4 indicates a transparent plate and G indicates a gap or space.

The unsaturated polyester used in this invention is obtained by condensation reaction of an acid component containing unsaturated dibasic acid and/or acid anhydride thereof with an alcohol component.

The unsaturated dibasic acid and/or acid anhydride thereof used for preparation of unsaturated polyester in this invention includes maleic acid, maleic anhydride, fumaric acid, itaconic acid, citraconic acid, etc. These may be used alone or in combination of two or more. If necessary, saturated polybasic acid and/or acid anhydride thereof may be used. As examples thereof, mention may be made of phthalic acid, phthalic anhydride, isophthalic acid, terephthalic acid, trimellitic acid, trimellitic anhydride, succinic acid, azelaic acid, adipic acid, tetrahydrophthalic acid, tetrahydrophthalic anhydride, hexahydrophthalic acid, hexahydrophthalic anhydride, endomethylenetetrahydrophthalic anhydride, etc. These may be used alone in combination of two or more.

As alcohol components, there may be used dihydric alcohols such as ethylene glycol, diethylene glycol, propylene glycol, dipropylene glycol, 1,3-butanediol, 1,4-butanediol, 2,3-butanediol, 1,5-pentanediol, 1,6-hexanediol, triethylene glycol, neopentyl glycol, etc., trihydric alcohols such as glycerin, trimethylolpropane, etc., tetrahydric alcohols such as pentaerythritol, etc. These may be used alone or in combination of two or more. Further, halides of these alcohols such as chlorides, bromides, etc. may also be used.

As unsaturated polyesters used with styrene and/or derivative thereof and unsaturated compound having a refractive index of 1.5 or less, there may be used unsaturated polyester resins having a molecular weight of 1000–8000 per one unsaturated group which are obtained by reacting a saturated polyester having a molecular weight of 500–3000 obtained by reaction of a saturated polybasic acid and/or acid anhydride thereof with an alcohol with an unsaturated polybasic acid and/or acid anhydride thereof.

As the saturated polybasic acid and/or acid anhydride thereof which is used for obtaining saturated polyester by previously reacting with alcohol, the above-mentioned saturated polybasic acid and/or acid anhydride thereof can be used. As the alcohol, the above-mentioned alcohol is also usable therefor.

Production of unsaturated or saturated polyester by reacting unsaturated or saturated polybasic acid and/or acid anhydride thereof with alcohol is carried out by mainly a condensation reaction which proceeds with elimination of low molecules such as water produced by reaction of the two components, out of the system.

Reactors for carrying out said reaction are chosen which are made of glass, stainless steel, etc. and which are inert to an acid component. Preferred reactors are those which are equipped with a stirrer, a fractional distillator for prevention of running-out of an alcohol component caused by azeotropy of water and the alcohol component, a heater for elevating the temperature of reaction system, a temperature controlling circuit for said heater and an introduction device for nitrogen gas and the like.

The reaction is preferably carried out at a temperature of 150° C. or higher at which reaction rate is high. 160° C.–210° C. is more preferred to prevent coloration caused by an oxidation reaction at high temperatures.

The synthesis is preferably effected with passing of an inert gas such as nitrogen, carbon dioxide or the like in order to prevent side reactions due to oxidation at high temperatures.

The reaction is allowed to proceed with heating the system comprising a mixture of saturated polybasic acid and/or acid anhydride thereof with alcohol and removing out of the system the produced low molecular compounds such as condensation water and this is preferably carried out by spontaneous distillation or distillation under reduced pressure brought about by passing inert gas. When the low molecular compounds to be distilled off have a high boiling point, high vacuum is necessary.

Furthermore, in order to promote distillation of low molecular compound such as water, it is also possible to add to the system a solvent such as toluene or xylene as an azeotropic component to effect spontaneous distillation.

The degree of progress of the reaction can be known generally by measurement of the distillate produced by the reaction, quantitative measurement of the terminal functional group and measurement of the viscosity of the reaction system.

Unsaturated polyesters used with the polymerizable monomer, the low-temperature hardener and the high-temperature hardener are those which have a molecular weight of 1000–8000 per one unsaturated group.

Such unsaturated polyesters can be produced according to known methods by adjusting the blending ratio of the starting materials.

The molecular weight per one unsaturated group here is calculated from molar composition of charged acid component and alcohol component used for synthesis of unsaturated polyesters and can be obtained by subtructing weight of water corresponding to that eliminated when acid component and alcohol component reacts at a molar ratio of 1:1 from total weight of the charged acid component and alcohol component and dividing thus obtained difference by the number of unsaturated group contained in the unsaturated polyester (mol number of the unsaturated polybasic acid used). That is, this is a model calculation value obtained with ignoring the dehydration reaction based on excess acid component and alcohol component, the excess charging being usually carried out. For example, when 0.1 mol of maleic anhydride, 0.5 mol of adipic acid, 0.4 mol of phthalic anhydride and 1.05 mol of diethylene glycol are charged, namely, with alcohol being excess by 0.05 mol, molecular weight of unsaturated polyester per one unsaturated group is calculated as follows: $\{(98.1 \times 0.1 \text{ mol} + 146 \times 0.5 \text{ mol} + 148 \times 0.4 \text{ mol} + 106 \times 1.05 \text{ mol}) - 18.0 \times (0.1 \text{ mol} + 0.5 \text{ mol} \times 2 + 0.4 \text{ mol} \times 1)\} \div 0.1 \text{ mol} = 2273.1$.

When thus calculated molecular weight of unsaturated polyester per one unsaturated group is less than 1000, crosslinking density of hardened composition is high to cause cracking or peeling. When more than 8000, sufficient crosslinking does not occur and hence polymerization of polymerizable monomer results, which sometimes makes the hardened composition cloudy.

Furthermore, the insufficient crosslinking results in reduction of adhesiveness to front glass or face plate part of cathode ray tube to cause peeling under the conditions of high temperature and high humidity (85° C. and 90% R.H.).

As the polymerizable monomers used in this invention, mention may be made of styrene and/or derivatives thereof such as styrene, p-methylstyrene, α-methylstyrene, divinylbenzene, chlorostyrene, dichlorostyrene, vinyltoluene, etc.; acrylic acid, methacrylic acid and/or derivatives thereof such as acrylic acid, allyl acrylate, benzyl acrylate, butyl acrylate, ethyl acrylate, methyl acrylate, propyl acrylate, hydroxyethyl acrylate, methacrylic acid, methyl methacrylate, ethyl methacrylate, butyl methacrylate, propyl methacrylate, allyl methacrylate, benzyl methacrylate, hydroxyethyl methacrylate, dodecyl methacrylate, octyl methacrylate, pentyl methacrylate, trimethylolpropane triacrylate, ethylene glycol diacrylate, diethylene glycol diacrylate, triethylene glycol diacrylate, propylene glycol diacrylate, 1,6-hexanediol diacrylate, 1,4-butanediol diacrylate, dicyclopentadiene acrylate, ethylene glycol monoacrylate, diethylene glycol monoacrylate, neopentyl glycol diacrylate, bisphenol A alkylene oxide adduct diacrylates, hydrogenated bisphenol A diacrylate, trimethylolpropane trimethacrylate, ethylene glycol dimethacrylate, diethyllene glycol dimethacrylate, triethylene glycol dimethacrylate, propylene glycol dimethacrylate, 1,6-hexanediol dimethacrylate, 1,4-butanediol dimethacrylate, dicyclopentadiene methacrylate, ethylene glycol monomethacrylate, diethylene glycol monomethacrylate, neopentyl glycol dimethacrylate, bisphenol A alkylene oxide adduct dimethacrylates, hydrogenated bisphenol A dimethacrylate, etc.; unsaturated dibasic acid alkyl esters such as monomethyl fumarate, dimethyl fumarate, monomethyl maleate, dimethyl maleate, monoethyl fumarate, diethyl fumarate, monoethyl maleate, diethyl maleate, monopropyl fumarate, dipropyl fumarate, monopropyl maleate, dipropyl maleate, monobutyl fumarate, dibutyl fumarate, monooctyl fumarate, dioctyl fumarate, monomethyl itaconate, dimethyl itaconate, diethyl itaconate, monoethyl itaconate, monobutyl itaconate, dibutyl itaconate, monopropyl itaconate, dipropyl itaconate, etc.

These polymerizable monomers may be used alone or in combination of two or more.

Selection of these polymerizable monomers is depending on the kind of cathode ray tube. These may be used alone, but in order to prevent formation of stripe patterns and bright spots, styrene and/or derivative thereof and a monomer other than styrene and/or derivative thereof such as unsaturated dibasic acid alkyl ester, acrylic acid, methacrylic acid or derivative thereof are used in combination, preferably, in such a blending ratio as satisfying the following formula: (b')/((a')+(c')) = 1/10 − 10/1 [ wherein (a') denotes the number of unsaturated groups in unsaturated polyester, (b') denotes the number of unsaturated group in styrene and/or derivative thereof and (c') denotes the number of unsaturated group in the monomer other than styrene and/or derivative thereof.

The low-temperature hardeners used in this invention include ketone peroxide series organic peroxides such as, for example, methyl ethyl ketone peroxide, cyclohexanone peroxide, acetylacetone peroxide, methylacetoacetate peroxide, methylcyclohexanone peroxide, 3,3,5-trimethylcyclohexanone peroxide, etc. These may be used alone or in combination of two or more.

Amount of low-temperature hardener added is preferably 0.2-2.0% by weight of unsaturated polyester and polymerizable monomer considering operability and prevention of surface defects.

High-temperature hardeners include peroxyketal, diacyl peroxide and peroxy ester organic peroxides. As examples thereof, mention may be made of 1,1-bis(t-butylperoxy)3,3,5-trimethylcyclohexane, 2,2-bis(t-butylperoxy)octane, 1,1-bis(t-butylperoxy)cyclohexane, lauroyl peroxide, 3,3,5-trimethylhexanoyl peroxide, benzoyl peroxide, t-butylperoxypivalate, t-butylperoxyneodecanoate, t-butylperoxy 2-ethylhexanoate, t-butylperoxylaurate, t-butylperoxy 3,3,5-trimethylhexanoate, t-butylperoxybenzoate, t-butylperoxyisopropylcarbonate, etc. These may be used alone or in combination of two or more. For the same reasons as above, amount of these high-temperature hardeners is also preferably 0.2-2.0% by weight of unsaturated polyester and polymerizable monomer.

The object of this invention can be attained by use of low-temperature hardener and high-temperature hardener in combination as hardener which constitutes the adhesive layer.

Molecular weight of the saturated polyester used for preparation of the unsaturated polyester having a molecular weight of 1000-8000 per one unsaturated group is 500-3000. This can be accomplished by adjusting blending ratio and progress of reaction by known method. When molecular weight of the saturated polyester is less than 500, short-time molding of cathode ray tube is difficult and when more than 3000, viscosity increases and bubbles are apt to remain in the hardened composition. Thus, molecular weight of the saturated polyester is within the range of 500-3000. In this case, the molecular weight is number-average molecular weight.

Further, when molecular weight of the saturated polyester is less than 500, sufficient crosslinking distance cannot be obtained and resistance to cracking When more than 3000, viscosity of the produced unsaturated polyester is increased to make operability unsatisfactory.

Unsaturated polybasic acid and/or acid anhydride thereof include, for example, maleic acid, maleic anhydride, fumaric acid, itaconic acid, citraconic acid, etc. Amount thereof is set so that the obtained unsaturated polyester has a molecular weight of 1000-8000 per one unsaturated group.

The molecular weight of unsaturated polyester per one unsaturated group is, as mentioned previously, a value calculated from charged mol composition of acid and alcohol used in synthesis of unsaturated polyester. When molecular weight of unsaturated polyester per one unsaturated group is less than 1000, crosslinking density of the hardened resin is high to cause peeling from front glass or cathode ray tube face plate part.

When molecular weight of unsaturated polyester per one unsaturated group is more than 8000, hardening of composition is slow and short-time molding which is one of the objects of this invention becomes difficult.

As styrene and/or derivative thereof which dissolves thus obtained unsaturated polyester, there may be used styrene, p-methylstyrene, divinylbenzene, chlorostyrene, etc. These may be used alone or in combination of two or more.

Homopolymerization of styrene causes formation of defects in resin layer such as optically non-homogeneous portions called surface sparklings or striae. Styrene has a refractive index of 1.5 or more which is higher than that of unsaturated polyester and this difference in refractive index causes optical non-homogeneity. Therefore, the surface sparklings and striae are prevented by copolymerizing an unsaturated compound of 1.5 or less in refractive index with styrene.

As unsaturated compounds having a refractive index of 1.5 or less, mention may be made of, for example, monoesters or diesters of unsaturated dibasic acids such as monomethyl fumarate, dimethyl fumarate, monomethyl maleate, dimethyl maleate, monoethyl fumarate, diethyl fumarate, monoethyl maleate, diethyl maleate, monopropyl fumarate, dipropyl fumarate, monopropyl maleate, dipropyl maleate, monobutyl fumarate, dibutyl fumarate, monooctyl fumarate, dioctyl fumarate, monomethyl itaconate, dimethyl itaconate, diethyl itaconate, monoethyl itaconate, monobutyl itaconate, dibutyl itaconate, monopropyl itaconate, dipropyl itaconate, etc., acrylic acid, methacrylic acid or derivatives thereof such as acrylic acid, allyl acrylate, benzyl acrylate, butyl acrylate, ethyl acrylate, methyl acrylate, propyl acrylate, hydroxyethyl acrylate, methacrylic acid, methyl methacrylate, ethyl methacrylate, butyl methacrylate, propyl methacrylate, allyl methacrylate, benzyl methacrylate, hydroxyethyl methacrylate, dodecyl methacrylate, octyl methacrylate, pentyl methacrylate, trimethylolpropane tri(meth)acrylate (which means methacrylate or acrylate here and in the following), ethylene glycol di(meth)acrylate, diethylene glycol di(meth)acrylate, triethylene glycol di(meth)acrylate, propylene glycol di(meth)acrylate, 1,6-hexanediol di(meth)acrylate, 1,4-butanediol di(meth)acrylate, dicyclopentadiene (meth)acrylate, ethylene glycol mono(meth)acrylate, diethylene glycol mono(meth)acrylate, neopentyl glycol di(meth)acrylate, etc. These may be used alone or in combination of two or more. When refractive index of the unsaturated compound is more than 1.5, hardening strain occurs in the hardened composition, resulting in stripe patterns or birht spots on the screen of cathode ray tube. The refractive indices are those which have already been shown in literatures.

In this invention, it is preferred to use the unsaturated polyester, styrene and/or derivative thereof and unsaturated compound so that (b)/((a)+(c)) is 1/5−5/1 wherein (a) denotes the number of unsaturated group in the unsaturated polyester, (b) denotes the number of unsaturated group in styrene and/or derivative thereof and (c) denotes the number of unsaturated group in the unsaturated compound having a refractive index of 1.5 or less. More preferably, (b)/{(a)+(c)} is ½−3/1.

When (b)/{(a)+(c)} is more than 5/1, hardening strain occurs upon hardening of unsaturated polyester resin composition to produce stripe patterns or bright spots on the screen of cathode ray tube which will damage commercial value thereof.

On the other hand, when the value is less than 1/5, viscosity of unsaturated polyester resin composition is high and sometimes, injection operation is very difficult to perform, removal of bubbles becomes difficult or hardening strain is apt to occur.

Thus prepared unsaturated polyester resin composition for treatment of cathode ray tube according to this invention which, if necessary, may further contain a polymerization inhibitor such as hydroquinone, pyrocatechol, 2,6-di-tertiary butyl para-cresol or the like can be hardened with, for example, organic peroxide catalysts such as methyl ethyl ketone peroxide, benzoyl peroxide, cumene hydroperoxide, lauroyl peroxide, etc.

These organic peroxide catalysts may be used in combination with hardening accelerators such as metallic soaps such as cobalt naphthenate, cobalt octoate, etc., quaternary ammonium salts such as dimethylbenzylammonium chloride, etc., β-diketones such as acetylacetone, etc., amines such as dimethylaniline, N-ethyl-m-toluidine, triethanolamine, etc.

Further, the unsaturated polyester resin compositions of this invention can be photo-hardened using photopolymerization initiators such as, for example, diphenyl disulfide, benzoin, benzoinmethyl ether, benzoin ethyl ether, benzoin-n-propyl ether, benzoin isopropyl ether, benzoin sec-butyl ether, benzoin-2-pentyl ether, benzoin cyclohexyl ether, dimethylbenzyl ketal, etc.

The above organic peroxides and photopolymerization initiators may be used in combination.

The composition of this invention may further contain dyes, plasticizers, ultraviolet ray absorbers etc.

Thickness of the resin composition is preferably 1.5–5.0 mm considering adhesiveness and problem of leakage. Stable quality and productivity can be obtained with a thickness of 2.5–4.0 mm and a thickness of 3 mm affords especially effective results.

For compositions which use low-temperature hardener and high-temperature hardener, weight ratio of low-temperature hardener:high-temperature hardener is preferably 10:1–1:2 in view of hardening time and hardenability.

Use of the low-temperature hardener and high-temperature hardener in combination accelerates reaction because radicals are formed at two stages in spite of increase in the amount of radicals formed and besides inhibits formation of hardening strain to cause formation of no defects on screen.

Moreover, by the reaction of saturated polyester with unsaturated polybasic acid, distance between the crosslinkages can be certainly extended whereby flexibility of adhesive is increased and resistance to cracking is enhanced.

Further, copolymerization of styrene with unsaturated compound of 1.5 or less in refractive index prevents formation of optically non-homogeneous portions such as surface glitters and striae in resin layer.

Some explanations will be made on preparation of cathode ray tubes using the composition of this invention with reference to the drawings.

Figure 2:
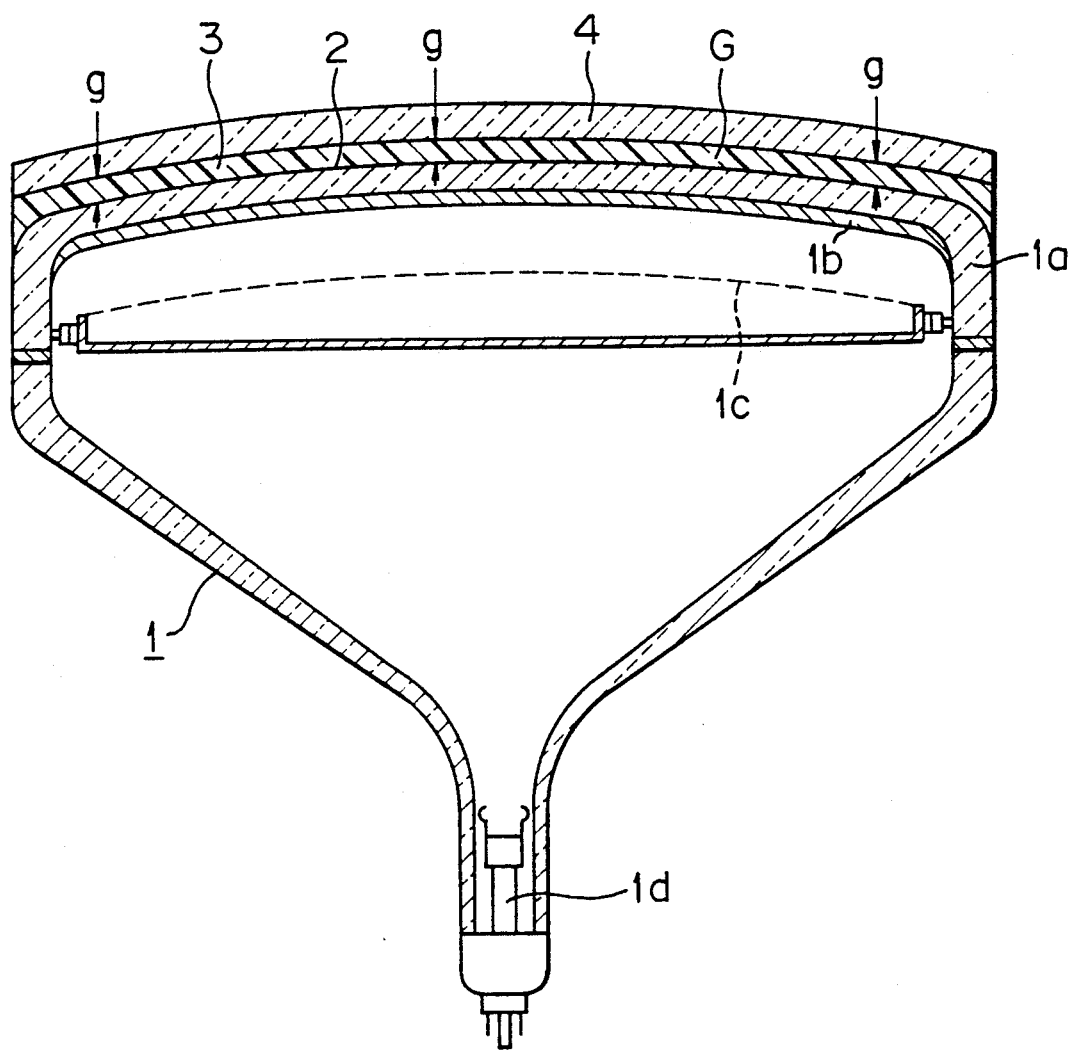
Figure 3:
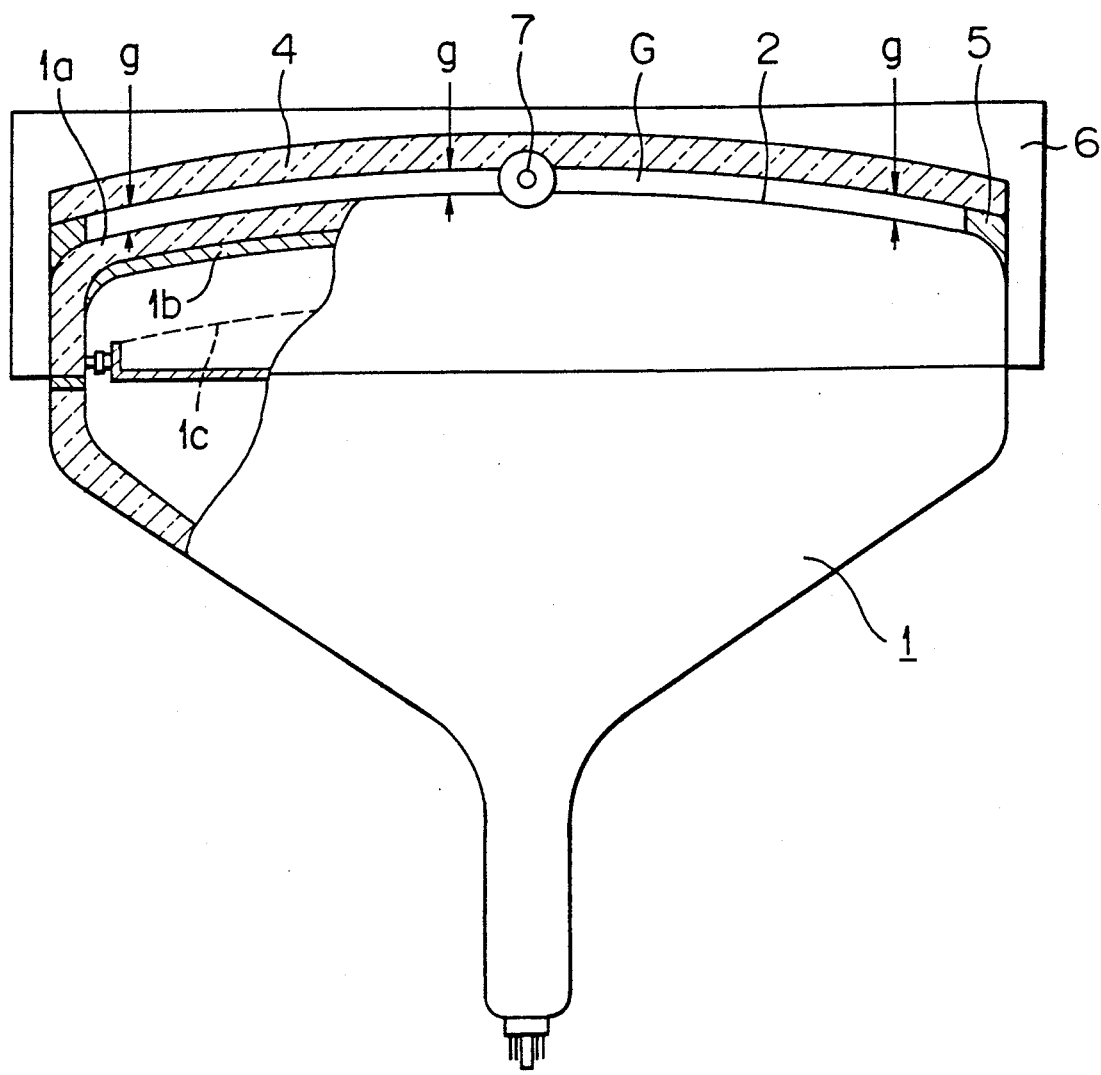

FIG. 3 illustrates the method for production of a cathode ray tube according to this invention wherein the same reference numbers and marks as in FIG. 2 are used for indicating the same portions as in FIG. 2. First, face plate part 2 of cathode ray tube body 1 is placed upward and spacer 5 is provided at circumferential edge part of the face plate part 2. Non-reflective transparent plate 4 is placed on said spacer 5 at a given distance g from the surface of face plate part 2. Tape 6 of a synthetic resin is wound round the thus arranged non-reflective transparent plate 4 and cathode ray tube body 1. An injection opening 7 which connects with space G formed between the non-reflective transparent plate 4 and the face plate part 2 is provided at a part of the tape 6. Then, this cathode ray tube body 1 is preheated to 30°–60° C. and simultaneously therewith the main components of adhesives Nos. 1–4 in Table 5 are heated to about 40° C. and then mixed with those of Nos. 5–6 and well stirred and this mixture is filled in the space G through injection opening 7, which is then sealed. Then, this is heated, as it is, to a low temperature of 70° C. for 1 hour and then heated at a high temperature of 100° C. for 1 hour to bond the non-reflective transparent plate 4 to the cathode ray tube body 1. Thereafter, surplus portions of the injection opening 7 and tape 6 are cut off to complete a cathode ray tube as shown in FIG. 2.

According to such method, non-reflective transparent plate 4 can be easily bonded to face plate part 2 with a certain space therebetween by using the step of injection and hardening of unsaturated polyester resin composition and besides a sufficient adhesiveness can be obtained since properties of the adhesive solution do not greatly change. The reaction of the resin in this production of cathode ray tube may be accelerated by increasing amount of hardener or raising the hardening temperature. However, according to such known methods, reaction rapidly proceeds to often produce hardening strain in the resin, which may cause formation of optically non-homogeneous portions such as stripes or spots and formation of cracks and peeling as explained hereabove. However, reaction can be accelerated with preventing formation of hardening strain by using low-temperature hardener and high-temperature hardener in combination and heating the composition at two stages suitable for respective hardeners or heating the composition gradually from low temperature to high temperature as shown in this example. The reaction of unsaturated polyester resin proceeds by radical polymerization and this reaction proceeds more rapidly with increase of amount of radicals formed. Therefore, when a single hardener is used as in the conventional method, radicals are nearly simultaneously formed at a certain temperature and hence hardening strain is readily generated while when low-temperature and high-temperature type hardeners are used in combination as in this invention, radicals are formed at a plurality of stages and so, hardening strain is difficult to occur even if amount of radicals is increased. Further, hardening strain is also difficult to occur even if reaction time is prolonged. In addition, the reaction time can be shortened. From the point of adhesion strength, high hardening temperature is preferred and adhesiveness is increased with hardening at higher temperatures. However, if the adhesive solution is heated to high temperature immediately after injection into the space G, there are the problems that uneven hardening occurs and viscosity is rapidly increased due to convection of the adhesive solution and thus air bubbles included at the time of injection are not released. On the other hand, according to this invention, since a heat treatment at low temperature is first effected and then a heat treatment at the higher temperature is effected, the air bubbles are removed and uneven hardening can be prevented by the former low-temperature treatment and adhesion strength can be increased and adhesiveness can be improved by the latter high-temperature heat treatment.

In a multi-stage heating step, the heating temperature at a later stage is higher than that at an earlier stage. More particularly, the heating temperature at the earlier stage is 40°-80° C. and that at the latter stage is 90° C.-130° C. Also, when continuously elevating the temperature during a heating step, heating is carried out in a range of 40° C.-130° C.

According to the method of this invention which uses low-temperature hardener and high-temperature hardener in combination, molding can be performed in a short time, no unreacted monomers remain, no hardening strain is formed, occurrence of cracks, peeling and optically non-homogeneous portions can be inhibited and thus excellent cathode ray tubes free from defects on screen can be obtained.

This invention is further illustrated by the following examples wherein part is by weight.

EXAMPLES 1–4 AND COMPARATIVE EXAMPLES 1 AND 2

The following components were charged in a 3 liter four necked flask equipped with a stirrer, a condenser, a nitrogen gas introducing pipe and a thermometer:

| | |
|---|---|
| Diethylene glycol | 1166 parts |
| Adipic acid | 584 parts |
| Phthalic anhydride | 740 parts |
| Fumaric acid | 116 parts |

Temperature of the content was elevated to 150° C. over a period of 1.5 hours by a heating mantle while passing slowly nitrogen gas therethrough and further elevated to 200° C. over a period of 4 hours and the content was kept at that temperature. After lapse of about 10 hours, unsaturated polyester A having an acid value of 34 was obtained Temperature was lowered to 100° C., followed by adding 0.3 part of hydroquinone as a polymerization inhibitor. Then, this unsaturated polyester A was flown onto a stainless steel vat and left to cool to room temperature. Thus obtained unsaturated polyester A had a molecular weight per one unsaturated group of 2336.

This unsaturated polyester A was dissolved in a mixture of styrene and dibutyl fumarate in accordance with the blending ratio as shown in Table 1 to obtain unsaturated polyester resin compositions. In Table 1, the values of (a'), (b') and (c') denote the number of unsaturated group as previously explained. To thus obtained unsaturated resin compositions were added 0.03% by weight of cobalt octoate (metal content 6% by weight: manufactured by Dainippon Ink & Chemicals Inc.) and an organic peroxide as shown in Table 1.

From a silicon plate of 3 mm thick×250 mm×250 mm was cut off a square piece of 240 mm×240 mm by a razor leaving a frame-like edge portion and an injection slit was made at a portion of this frame. This frame was placed as a spacer on a transparent flat glass plate. On this spacer was placed a transparent flat glass plate of 3 mm×250 mm×250 mm and the two glass plates were fastened by a fastener to obtain a casting jig. The above prepared unsaturated polyester resin composition was injected from the slit provided at said spacer of this casting jig.

This was left in an electric dryer at 60° C. for 60 minutes and then further at 110° C. for 1 hour to harden the resin to obtain an unsaturated polyester resin cast plate. In Comparative Examples 1 and 2, compositions as shown in Table 1 were prepared using the unsaturated polyester A of Examples 1–4, to which PERMEK N (55% methyl ethyl ketone peroxide: manufactured by Nippon Oil & Fats Co., Ltd.) was added as an organic peroxide and then cast plates were made in the same manner as in Examples 1–4.

Characteristics of thus obtained cast plates are shown in Table 1. In Table 1, hardening strain was evaluated by visual determination of presence or absence of stripe patterns and visually counting the number of bright spots.

The results show that the products of Examples 1–4 were higher than those of Comparative Examples 1 and 2 in Shore hardness (A) (measured according to JIS Z 2246) which showed hardening degree and the former were hardened in a shorter time than the latter.

TABLE 1

|  |  | Example 1 | Example 2 | Example 3 | Example 4 | Comparative Example 1 | Comparative Example 2 |
|---|---|---|---|---|---|---|---|
| Blending ratio (part) | Unsaturated polyester A | 100 | 100 | 100 | 100 | 100 | 100 |
|  | (a') | (0.04) | (0.04) | (0.04) | (0.04) | (0.04) | (0.04) |
|  | Styrene | 20 | 20 | 20 | 20 | 20 | 20 |
|  | (b') | (0.19) | (0.19) | (0.19) | (0.19) | (0.19) | (0.19) |
|  | Dibutyl fumarate | — | 11 | 11 | 11 | 11 | 11 |
|  | (c') | — | (0.05) | (0.05) | (0.05) | (0.05) | (0.05) |
|  | (b')/{(a') + (c')} | 4.8 | 2.1 | 2.1 | 2.1 | 2.1 | 2.1 |
|  | PERMEK N | 1 | 1 | 1 | 1 | 1 | 2 |
|  | Benzoyl peroxide | 0.5 | — | — | — | — | — |
|  | t-Butylperoxyisopropyl carbonate | — | 0.5 | — | — | — | — |
|  | t-Butylperoxy laurate | — | — | 0.5 | — | — | — |
|  | 2,2-Bis(t-butylperoxy)octane | — | — | — | 0.5 | — | — |
| Result | Hardening strain  Stripe | None | None | None | None | None | None |
|  | Bright spot | 70 | None | None | None | None | None |
|  | Shore hardness (A) Initial | 37 | 40 | 37 | 39 | 20 | 24 |
|  | after 2 hours/120° C. | 40 | 44 | 42 | 44 | 28 | 29 |
|  | after 4 hours/120° C. | 44 | 44 | 43 | 45 | 35 | 37 |

Organic peroxide: Products of Nippon Oil & Fats Co.

EXAMPLES 5-7

The following components were charged in a 3 liter four necked flask equipped with the same devices as in Example 1:

| Dipropylene glycol | 1474 parts |
|---|---|
| Adipic acid | 1241 parts |
| Maleic anhydride | 147 parts |

Temperature of the content was elevated to 150° C. over a period of 1 hour by a heating mantle while passing a nitrogen gas therethrough and then was further elevated to 200° C. over a period of 4 hours and the content was kept at this temperature. After lapse of about 12 hours, an unsaturated polyester B having an acid value of 25 was obtained.

Temperature was lowered to 100° C. and 0.3 part of hydroquinone was added thereto as a polymerization inhibitor. Then, the unsaturated polyester B was flown out into a stainless steel vat and left to cool to room temperature.

Thus obtained unsaturated polyester B had a molecular weight per one mol of unsaturated group of 1686.

This unsaturated polyester was dissolved in a polymerizable monomer as shown in Table 2, followed by adding 0.03% by weight of cobalt octoate. Then, the composition was hardened with organic peroxide shown in Table 2 and in the same manner as in Examples 1-4. characteristics of the obtained cast plates were evaluated and the results are shown in Table 2. It is recognized that hardening could be performed in a short time in Examples 5-7, too.

TABLE 2

|  |  | Example 5 | Example 6 | Example 7 |
|---|---|---|---|---|
| Blending ratio (part) | Unsaturated polyester B | 100 | 100 | 100 |
|  | (a') | (0.06) | (0.06) | (0.06) |
|  | Styrene | 20 | 20 | 20 |
|  | (b') | (0.19) | (0.19) | (0.19) |
|  | Diethyl fumarate | 10 | 10 | 10 |
|  | (c') | (0.06) | (0.06) | (0.06) |
|  | (b')/{(a') + (c')} | 1.6 | 1.6 | 1.6 |
|  | Methyl ethyl ketone peroxide | 1 | 1 | 1 |
|  | Benzoyl peroxide | 0.5 | — | — |
|  | t-Butylperoxy benzoate | — | 0.5 | — |
|  | t-Butylperoxy laurate | — | — | 0.5 |
| Hardening strain | Stripe | None | None | None |
|  | Bright spots | None | None | None |
| Hardness (Shore A) | Initial state | 44 | 42 | 45 |
|  | after 2 hours/120° C. | 48 | 46 | 47 |
|  | after 4 hours/120° C. | 50 | 49 | 49 |

Organic peroxide: Products of Nippon Oil & Fats Co.

EXAMPLES 8-11 AND COMPARATIVE EXAMPLES 3-6

(1) Preparation of unsaturated polyester A

The following components were charged in the same four necked flask as used in Example 1:

| Diethylene glycol | 1113 parts |
|---|---|
| Adipic acid | 584 parts |
| Phthalic anhydride | 740 parts |

Temperature of the content was elevated to 150° C. over a period of 1.5 hours by a heating mantle while passing slowly a nitrogen gas and then further elevated to 200° C. over a period of 4 hours and the content was kept at this temperature. After about 8 hours, there was obtained a saturated polyester having an acid value of 21 and a number-average molecular weight of 980. This was cooled to 100° C. and thereto was added 98 parts of maleic anhydride, followed by elevating the temperature to 150° C. over a period of 1 hour and further to 200° C. over a period of 3 hours. The polyester was kept at this temperature. After about 7 hours, there was obtained an unsaturated polyester A having an acid value of 28. This was cooled to 100° C. and thereto was added 0.3 part of hydroquinone as a polymerization inhibitor. This unsaturated polyester A was flown into a stainless steel vat and left to cool to room temperature. Molecular weight of this unsaturated polyester A per one unsaturated group was 2283.

(2) Preparation of unsaturated polyester B

The following components were charged in the same flask as used above:

| Diethylene glycol | 1166 parts |
|---|---|
| Adipic acid | 584 parts |
| Phthalic anhydride | 740 parts |
| Maleic anhydride | 98 parts |

Temperature of the content was elevated to 150° C. over a period of 1.5 hour by a heating mantle while passing slowly a nitrogen gas therethrough and then further to 200° C. over a period of 4 hours. The content was kept at this temperature. After about 10 hours, an unsaturated polyester B having an acid value of 29 was obtained. Temperature was reduced to 100° C. and 0.3 part of hydroquinone was added as a polymerization inhibitor. Then, this unsaturated polyester B was flown into a stainless steel vat and left to cool to room temperature. This unsaturated polyester B had a molecular weight per one unsaturated group of 2336.

Thus obtained unsaturated polyesters A and B were dissolved in a mixture of styrene and an unsaturated compound having a refractive index of 1.5 or less (value in { } denotes refractive index) to obtain unsaturated polyester resin compositions.

To 100 parts of these unsaturated polyester resin compositions were added 0.025 part of cobalt octoate (metal content 6% by weight: manufactured by Dainippon Ink & Chemicals Inc.) and 1 part of PERMEK N (55% methyl ethyl ketone: manufactured by Nippon Oil & Fats Co., Ltd.).

Cast plates were made from these compositions in the same manner as in Examples 1-4 and the characteristics thereof are shown in Table 3.

The products obtained in Examples 8-11 had no hardening strain and neither stripe patterns nor bright spots were recognized. In the products obtained in Comparative Examples 3 and 4, stripe patterns were not seen, but bright spots were generated.

The products of Examples 8-11 and Comparative Example 3 using unsaturated polyester A were higher than those of Comparative Examples 4, 5 and 6 using unsaturated polyester B in Shore A hardness and the former could be hardened in a shorter time. Further, cracks and peeling were not recognized for the products of Examples 8-11 while these were recognized for products of Comparative Examples 3-6.

In Table 3, hardening strain was evaluated by visual observation of presence of stripe patterns and visually counting the number of bright spots. Presence of peeling and cracks was also determined by visual observation. These are same in other tables.

TABLE 3

| | | Example 8 | Example 9 | Example 10 | Example 11 |
|---|---|---|---|---|---|
| Blending ratio (part) | Unsaturated polyester A (a) | 100 (0.04) | 100 (0.04) | 100 (0.04) | 100 (0.04) |
| | Unsaturated polyester B (a) | — | — | — | — |
| | Styrene (b) | 20 (0.19) | 20 (0.19) | 20 (0.19) | 20 (0.19) |
| | Dibutyl fumarate (c) (1.445) | 11 (0.05) | — | — | 5 (0.02) |
| | Methyl methacrylate (c) (1.412) | — | 10 (0.1) | — | 10 (0.1) |
| | Diethylene glycol dimethacrylate (c) (1.451) | — | — | 10 (0.04) | — |
| | (b)/{(a) + (c)} | 2.1 | 1.4 | 2.4 | 1.2 |
| Hardening strain | Stripe | None | None | None | None |
| | Bright spots | None | None | None | None |
| Hardness (Shore A) | Initial stage | 36 | 39 | 39 | 38 |
| | After 3 hours/120° C. | 44 | 43 | 45 | 44 |
| | After 5 hours/120° C. | 45 | 47 | 47 | 47 |
| Peeling (after 50 hours/150° C.) | | None | None | None | None |
| Cracks (after 50 hours/150° C.) | | None | None | None | None |
| | | Comparative Example 3 | Comparative Example 4 | Comparative Example 5 | Comparative Example 6 |
| Blending ratio (part) | Unsaturated polyester A (a) | 100 (0.04) | — | — | — |
| | Unsaturated polyester B (a) | — | 100 (0.04) | 100 (0.04) | 100 (0.04) |
| | Styrene (b) | 25 (0.24) | 25 (0.24) | 20 (0.19) | 20 (0.19) |
| | Dibutyl fumarate (c) (1.445) | — | — | 11 (0.05) | 5 (0.02) |
| | Methyl methacrylate (c) (1.412) | — | — | — | 10 (0.1) |
| | Diethylene glycol dimethacrylate (c) (1.451) | — | — | — | — |
| | (b)/{(a) + (c)} | 6.0 | 6.0 | 2.1 | 1.2 |
| Hardening strain | Stripe | None | None | None | None |
| | Bright spots | 80 | 75 | None | None |
| Hardness (Shore A) | Initial stage | 37 | 18 | 16 | 19 |
| | After 3 hours/120° C. | 44 | 29 | 30 | 30 |
| | After 5 hours/120° C. | 47 | 40 | 42 | 44 |
| Peeling (after 50 hours/150° C.) | | None | Occurred | None | Occurred |
| Cracks (after 50 hours/150° C.) | | None | Occurred | Occurred | None |

EXAMPLE 12

The following components were charged in the same flask as used in Examples 8-11:

| | |
|---|---|
| Diethylene glycol | 1080 parts |
| Adipic acid | 584 parts |
| Phthalic anhydride | 740 parts |

Reaction was effected in the same manner as in Examples 8-11 and after about 10 hours, saturated polyester of 5 in acid value and 1700 in molecular weight was obtained. Thereto was added 98 parts of maleic anhydride and reaction was effected in the same manner as in Examples 8-11. After about 5 hours, there was obtained an unsaturated polyester C having an acid value of 25 and a molecular weight per one unsaturated group of 2250. Temperature was reduced to 100° C. and 0.3 part of hydroquinone was added as a polymerization inhibitor. Then, the unsaturated polyester C was flown into a stainless steel vat and left to cool to room temperature. This was dissolved in a mixture of styrene and an unsaturated compound as shown in Table 4 to obtain an unsaturated polyester resin composition. To 100 parts of this unsaturated polyester resin were added 0.025 part of cobalt octoate and 1 part of PERMEK N and cast plate was made in the same manner as in Example 1. Characteristics of this cast plate are shown in Table 4.

EXAMPLE 13

A saturated polyester having an acid value of 90 and a number-average molecular weight of 500 was obtained from the same formulation as in Example 12. Thereto was added maleic anhydride to obtain unsaturated polyester D having an acid value of 30 and a molecular weight per one unsaturated group of 2250. This was dissolved in styrene and the unsaturated compound as shown in Table 4 to obtain an unsaturated polyester resin. To 100 parts of this unsaturated polyester resin were added 0.025 part of cobalt octoate and 1 part of PERMEK N and a cast plate was made therefrom in the same manner as in Example 1. The results are shown in Table 4.

EXAMPLE 14

In the same manner as in Example 12, the following components were reacted to obtain a saturated polyester having an acid value of 15 and a number-average molecular weight of 1300.

| | |
|---|---|
| Dipropylene glycol | 1380 parts |
| Adipic acid | 730 parts |
| Tetrahydrophthalic anhydride | 608 parts |

To the saturated polyester was added 116 parts of fumaric acid and reaction was effected to obtain an unsaturated polyester E having an acid value of 22 and a molecular weight per one unsaturated group of 2546.

This was dissolved in a mixture of styrene and an unsaturated compound having a refractive index of 1.5 or less (value in { } is refractive index) to obtain an unsaturated polyester resin. To 100 parts of this unsaturated polyester resin were added 0.025 part of cobalt octoate and 1 part of PERMEK N and a cast plate was made therefrom according to Example 1. The results of evaluation of its characteristics are shown in Table 4.

The products of Examples 12-14 had no hardening strain and neither stripe patterns nor bright spots were recognized. Further, good results were obtained on peeling and cracking.

TABLE 4

| | | Example 12 | Example 13 | Example 14 |
|---|---|---|---|---|
| Blending ratio (part) | Unsaturated polyester C | 100 | — | — |
| | (a) | (0.04) | — | — |
| | Unsaturated polyester D | — | 100 | — |
| | (a) | — | (0.04) | — |
| | Unsaturated polyester E | — | — | 100 |
| | (a) | — | — | (0.04) |
| | Styrene | 20 | 20 | 20 |
| | (b) | (0.19) | (0.19) | (0.19) |
| | Dibutyl fumarate (1.445) | 11 | 11 | 11 |
| | (c) | (0.05) | (0.05) | (0.05) |
| | (b)/{(a) + (c)} | 2.1 | 2.1 | 2.1 |
| Hardening strain | Stripe | None | None | None |
| | Bright spots | None | None | None |
| Hardness (Shore A) | Initial stage | 38 | 25 | 35 |
| | After 3 hours/120° C. | 45 | 38 | 43 |
| | After 5 hours/120° C. | 46 | 44 | 44 |
| Peeling (after 50 hours/150° C.) | | None | None | None |
| Cracks (after 50 hours/150° C.) | | None | None | None |

EXAMPLE 15

FIG. 2 is a sectional view of essential parts of a cathode ray tube which is one example of this invention. In this FIG. 2, a transparent plate 4 subjected to non-reflective treatment is placed in front of face plate part 2 of cathode ray tube body 1 with a space G of nearly constant distance g (3 mm) therebetween.

In cathode ray tube body 1, shadow mask 1c and electron gun 1d are provided opposite to fluorescent screen 1b provided on inner surface of panel 1a. In said space G, resin composition 3 having the composition of the following Table 5 was filled and hardened to bond transparent plate 4 to the face plate part.

TABLE 5

| | |
|---|---|
| (1) Unsaturated polyester | 70 parts |
| (2) Styrene | 20 parts |
| (3) Dibutyl fumarate | 30 parts |
| (4) Cobalt octoate (metal content 6 wt %, manufactured by Dainippon Ink & Chemicals Inc.) | 0.025 part |
| (5) Hydroquinone | 0.01 part |
| (6) Low-temperature hardener [PERMEK N (55% methyl ethyl ketone peroxide manufactured by Nippon Oil & Fats Co.)] | 1.0 part |
| (7) High-temperature hardener [PERBUTYL | 0.5 part |

TABLE 5-continued (t-butylperoxy laurate: manufactured by Nippon Oil & Fats Co.)]

The unsaturated polyester in the above Table 5 was an unsaturated polyester having an acid value of 25 and a molecular weight per one unsaturated group of 2237 obtained by reacting 1.05 mol of diethylene glycol, and 0.1 mol of maleic anhydride at 200° C. for 10 hours.

To 70 parts of this unsaturated polyester were added 20 parts of styrene, 10 parts of dibutyl fumarate, 0.025 part of cobalt octoate and 0.01 part of hydroquinone as shown in Table 5 to dissolve the polyester. Thereto were added 1.0 part of the low-temperature hardener and 0.5 part of the high-temperature hardener as shown in Table 5 to harden the composition.

In the cathode ray tube made in this example, unreacted monomer in resin composition 3 was less than 0.5% by weight and the cathode ray tube was excellent one free from cracks, peeling and optically non-homogeneous portions due to hardening strain.

EXAMPLE 16

As shown in FIG. 3, non reflective transparent plate 4 was placed in front of face plate part 2 of cathode ray tube body 1 with a spacer of 3 mm thick being interposed therebetween and tape 6 was wound round it so as to prevent leakage of adhesive. The tape 6 was previously provided with an injection opening 7. A polyester resin composition as an adhesive was injected into the space between face plate part 2 and non-reflective transparent plate 4 from the injection opening 7 and the composition was hardened by heating.

Said unsaturated polyester was prepared in the same manner as in Example 1 using the following composition.

| | |
|---|---|
| Diethylene glycol | 1113 parts |
| Adipic acid | 584 parts |
| Phthalic anhydride | 740 parts |

This unsaturated polyester had a molecular weight of 2283 per one unsaturated group.

A polyester composition consisting of 70 parts of said unsaturated polyester, 20 parts of styrene and 10 parts of dibutyl fumarate as unsaturated compound having a refractive index of 1.5 or less and 0.025 part of cobalt octoate (metal content 6 wt%, manufactured by Dainippon Ink & Chemicals Inc.) as an accelerator was subjected to deaeration under reduced pressure and preheated to 40° C. and then 1 part of a peroxide (PERMEK N) as a hardener was added thereto, followed by stirring. This composition was injected from injection opening 7 and was heated at 70° C. for 2 hours to obtain a front glass bonded type cathode ray tube.

Thus obtained cathode ray tube was free from optically non-homogeneous portions such as surface glitter and striae. Further, neither cracks nor peeling occurred after heating test at 150° C. for 250 hours.

What is claimed is:

1. A method for producing a cathode ray tube which comprises a step of temporarily setting a non-reflective transparent plate in front of a face plate of a tube body with a given space therebetween, a step of filling said space with a resin composition consisting essentially of an unsaturated polyester rein having a molecular weight per one unsaturated group of 1000–8000, a polymerizable monomer, a low temperature hardener and a high temperature hardener and a step of heating said resin composition filled in the space to harden the composition, the heating step comprises a plurality of stages wherein heating temperature at a later stage is higher than that at an earlier stage, thereby bonding said tube body and said non-reflective transparent plate to each other.

2. A method according to claim 1 wherein the heating temperature at the earlier stage is 40° C.–80° C. and that at the later stage is 90° C.–130° C.

3. A method for producing a cathode ray tube which comprises a step of temporarily setting a non-reflective transparent plate in front of a face plate of a tube body with a given space therebetween, a step of filling said space with a resin composition consisting essentially of an unsaturated polyester resin having a molecular weight per one unsaturated group of 1000–8,000, a polymerizable monomer, a low temperature hardener and a high temperature hardener, and a step of heating said resin composition filled in the space to harden the composition, wherein the heating is carried out in the range of 40° C.–130° C. by continuously elevating the temperature, thereby to bond said tube body and said nonreflective transparent plate to each other.

4. A method according to claim 1, wherein the unsaturated polyester is obtained by reaction of an acid component containing at least one of an unsaturated polybasic acid and an acid anhydride thereof alone or admixed with at least one of a saturated polybasic acid and an acid anhydride thereof with an alcohol component.

5. A method according to claim 1, wherein a blending ratio of the low-temperature hardener and the high-temperature hardener is within a range of 10:1–1:2 in a weight ratio.

* * * * *